(12) United States Patent
Prock et al.

(10) Patent No.: US 8,942,129 B1
(45) Date of Patent: Jan. 27, 2015

(54) METHOD AND SYSTEM FOR OPTIMIZING INTER-FREQUENCY HANDOFF IN WIRELESS COVERAGE AREAS

(71) Applicant: Sprint Spectrum L.P., Overland Park, KS (US)

(72) Inventors: John W. Prock, Overland Park, KS (US); Maulik K. Shah, Overland Park, KS (US); Siddharth S. Oroskar, Overland Park, KS (US); Kurt M. Landuyt, Parkville, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 102 days.

(21) Appl. No.: 13/753,739

(22) Filed: Jan. 30, 2013

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)
*H04W 36/30* (2009.01)

(52) U.S. Cl.
CPC .................................... *H04W 36/30* (2013.01)
USPC ........... 370/252; 370/329; 370/332; 370/431; 455/439; 455/452.2

(58) Field of Classification Search
USPC ......... 370/252, 328, 329, 331, 332, 431, 461; 455/436, 438, 439, 442, 443, 444, 455/452.2
See application file for complete search history.

(56) References Cited

U.S. PATENT DOCUMENTS

| | | | |
|---|---|---|---|
| 7,313,398 B1 * | 12/2007 | Ramahi | 455/436 |
| 8,107,435 B1 * | 1/2012 | Singh et al. | 370/331 |
| 8,160,024 B1 * | 4/2012 | Ghaus et al. | 370/331 |
| 2001/0046879 A1 * | 11/2001 | Schramm et al. | 455/525 |
| 2005/0003827 A1 * | 1/2005 | Whelan | 455/454 |
| 2006/0023648 A1 * | 2/2006 | Amos | 370/310 |
| 2010/0008295 A1 * | 1/2010 | Ji et al. | 370/328 |
| 2010/0142477 A1 * | 6/2010 | Yokota | 370/331 |
| 2011/0122786 A1 * | 5/2011 | Koo et al. | 370/252 |
| 2012/0263145 A1 * | 10/2012 | Marinier et al. | 370/331 |
| 2013/0173259 A1 * | 7/2013 | Mittal et al. | 704/201 |
| 2013/0308470 A1 * | 11/2013 | Bevan et al. | 370/252 |

* cited by examiner

*Primary Examiner* — Benjamin H Elliott, IV

(57) ABSTRACT

A radio access network (RAN) may be configured to identify a set of wireless coverage areas in which to transmit inter-frequency search directives. Identifying the set of coverage areas may involve determining which of the coverage areas defined by the RAN have threshold weaker coverage on one carrier frequency than on another carrier frequency of that coverage area. For each coverage area of the set, the RAN may identify one or more WCDs operating in the coverage area that are operating on the coverage area's carrier frequency that has the weaker coverage. Based on the identifying of the WCDs, the RAN may send to each identified WCD an inter-frequency search directive to cause the WCD to scan for and report to the RAN a measurement of coverage on one or more carrier frequencies other than the carrier frequency on which the WCD is currently operating.

20 Claims, 6 Drawing Sheets

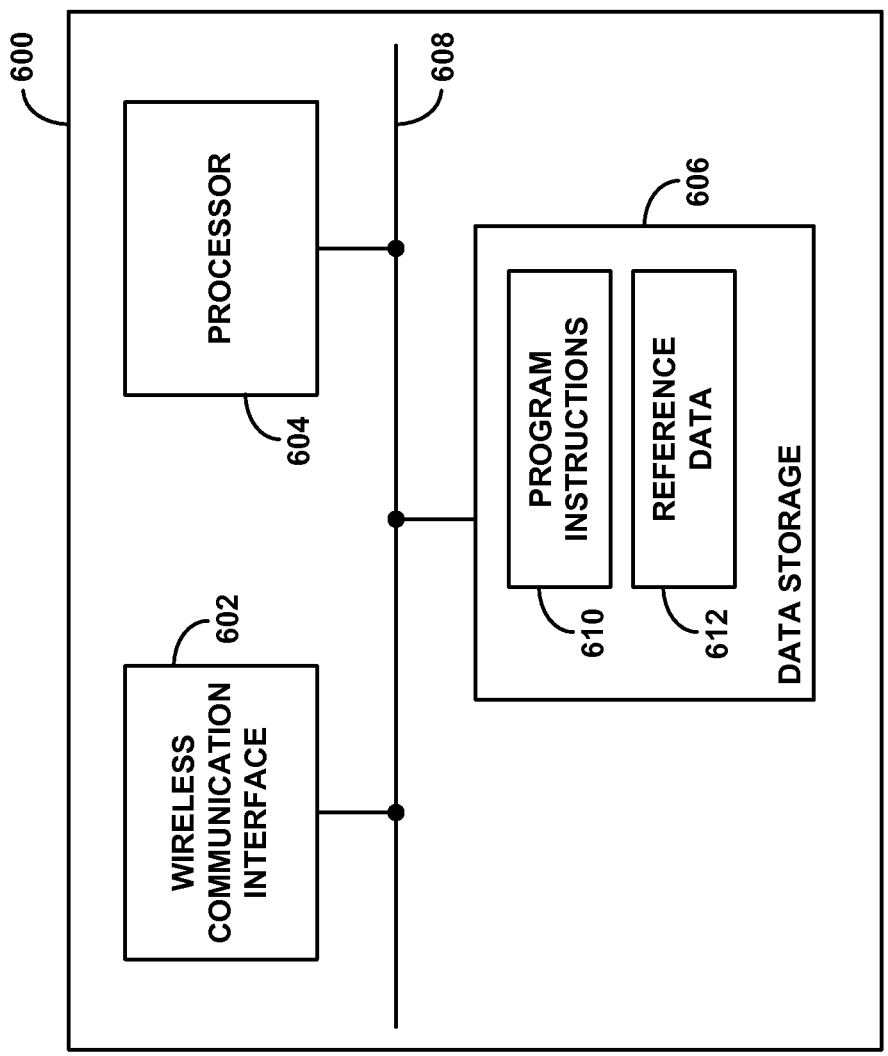

METHOD AND SYSTEM FOR OPTIMIZING INTER-FREQUENCY HANDOFF IN WIRELESS COVERAGE AREAS

BACKGROUND

Unless otherwise indicated herein, the materials described in this section are not prior art to the claims and are not admitted to be prior art by inclusion in this section.

To provide cellular wireless communication service, a wireless service provider or "wireless carrier" typically operates a radio access network (RAN) that defines one or more coverage areas in which wireless communication devices (WCDs) can be served by the RAN and can thereby obtain connectivity to broader networks such as the public switched telephone network (PSTN) and the Internet. A typical RAN may include one or more base stations (e.g., macro network cell towers and/or femtocells), each of which may radiate to define the coverage areas in which WCDs can operate. Further, each coverage area may operate on one or more radio carrier frequencies (e.g., radio frequency radiation patterns from a respective base station antenna). The base stations may then be coupled with a controller, which may then be coupled (e.g., directly or indirectly) with a switch or gateway that provides connectivity with a transport network such as the PSTN or the Internet. When a WCD, such as a cellular telephone, pager, or wirelessly-equipped computer, is positioned in a coverage area, the WCD communicates via a radio frequency air interface with the base station antennae of the coverage area. Consequently, a communication path can be established between the WCD and the transport network, via the air interface, the base station, the controller, and the switch or gateway.

In general, air interface communications in each coverage area of a cellular wireless communication system can be encoded or carried in a manner that distinguishes the communications in that coverage area from communications in adjacent coverage areas. For example, in a Code Division Multiple Access (CDMA) system, each coverage area has a respective pseudo-random noise offset or "PN offset" that is used to encode or modulate air interface communications in the coverage area distinctly from those in adjacent coverage areas. As another example, in a Long-Term Evolution (LTE) system, each coverage area is associated with a respective reference signal. Analogously, in other air interface protocols, communications in one coverage area may be distinguished from those in other coverage areas by frequency, time, and/or various other parameters. Further, a WCD may use one or more of the distinguishing parameters as a basis for detecting coverage of individual coverage areas (e.g., so as to facilitate evaluation of radio carrier frequency characteristics).

After registering in a particular coverage area, and while operating on a particular carrier frequency in the particular coverage area, the WCD may regularly scan for other coverage areas operating on the same carrier frequency. The WCD may continue to monitor the pilot signal or reference signals of the particular coverage area (e.g., the serving coverage area of the WCD) as well as the pilot signal or reference signals of adjacent coverage areas, and may at some point transmit to the serving base station or RAN a report indicating the strength of the monitored signals. For example, in a CDMA system, the WCD may transmit a pilot-strength-measurement message or data-rate-control message to the RAN. As another example, in an LTE system, the WCD may transmit a radio measurement report to the RAN. If the RAN determines, based on such reports, that an adjacent coverage area provides sufficiently stronger coverage than the currently serving coverage area of the WCD, the RAN may arrange for a handoff of the WCD to the adjacent coverage area.

Overview

Coverage areas defined by a RAN may operate on multiple carrier frequencies, and in some scenarios, a WCD may be arranged to autonomously scan for coverage on each such carrier frequency and select a coverage area in which to operate. In other scenarios, a WCD may operate on a given carrier frequency, and the WCD may not be arranged to autonomously scan for coverage on carrier frequencies other than the given carrier frequency. Rather, the WCD may be arranged to limit scanning to coverage areas operating only on the same carrier frequency to facilitate handoff to such a coverage area.

At times, it may be useful for the RAN to direct a WCD to scan for coverage across multiple carrier frequencies to facilitate inter-frequency handoff. As such, the RAN may send to the WCD an inter-frequency search directive to cause the WCD to scan for coverage on one or more carrier frequencies other than the given carrier frequency on which the WCD is currently operating. The WCD may then respond to such a directive by tuning to and scanning for coverage on the carrier frequencies designated in the directive. As a result of the scanning, the WCD may detect sufficiently strong coverage on another carrier frequency (e.g., by evaluating one or more distinguishable parameters of a particular carrier frequency and/or coverage area), and may report the stronger (or otherwise more preferable) coverage to the RAN so that the RAN may then invoke an inter-frequency handoff, of the WCD to the detected carrier frequency. Such a handoff may facilitate improved communications between the WCD and the RAN.

In some scenarios, continuous scanning in all or numerous coverage areas may negatively affect network performance. For example, many channel resources may be allocated in order to allow for the multiple messages/directives transmitted between the RAN and a WCD as a result of the scanning. In other scenarios, continuous scanning may negatively affect the performance of the WCD. The WCD may include, for example, a radio module or other transceiver used to communicate with the RAN. As the WCD regularly scans for coverage in the network, the WCD may be configured to continuously power-up and power-down the radio module, which may consume excessive battery power. Similarly, continually attempting to scan for and/or connect to wireless coverage areas (e.g., by leaving the radio module powered-up) rather than periodically powering-up and down the radio module may also consume battery power. As another example, the WCD continuously tuning away and re-tuning to scan for coverage may consume battery power as well.

While at times it may be desirable to scan for coverage across multiple carrier frequencies, it may not be desirable to continuously invoke inter-frequency scanning. Accordingly, disclosed are methods and systems for managing at what times and in which coverage areas inter-frequency scanning should take place, as well as managing which WCDs will perform such inter-frequency scanning.

One embodiment takes the form of a method carried out by a RAN that radiates to define a plurality of wireless coverage areas each operating on a plurality of carrier frequencies. The method includes the RAN identifying a set of the wireless coverage areas in which to transmit inter-frequency search directives, and identifying the set of wireless coverage areas includes determining which of the wireless coverage areas each have threshold weaker wireless performance on one carrier frequency of the coverage area than on another carrier frequency of the coverage area, and deeming to be members of the set only the determined wireless coverage areas. The method further includes, for each wireless coverage area of the identified set, the RAN identifying one or more wireless communication devices (WCDs) operating in the coverage area that are operating on the coverage area's carrier frequency that has the weaker wireless performance, and, based at least in part on the identifying of each of the one or more WCDs, sending to each identified WCD an inter-frequency search directive to cause the WCD to scan for and report to the RAN a measurement of wireless coverage on one or more carrier frequencies other than that on which the WCD is operating.

Another embodiment takes the form of a non-transitory computer-readable medium having stored thereon program instructions executable by a processing unit of a RAN to cause the RAN to perform functions comprising the method.

Yet another embodiment takes the form of a RAN entity that includes at least one wireless communication interface, at least one processor, a data storage, and program instructions stored in the data storage executable by the at least one processor for performing functions. The functions include those of the method described above, and further include sending to each WCD (e.g., of the one or more identified WCDs) a handoff directive to cause the WCD to hand off from the carrier frequency on which the WCD is operating to another carrier frequency, based on the measurement reported to the RAN entity by the one or more identified WCDs.

This overview is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 6 depicts a simplified block diagram of an example WCD arranged to operate in an example RAN in accordance with the present methods.

DETAILED DESCRIPTION

I. Introduction

The present methods and systems will now be described with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out of one or more of the functions described herein.

II. Example Communication System

Figure 1:
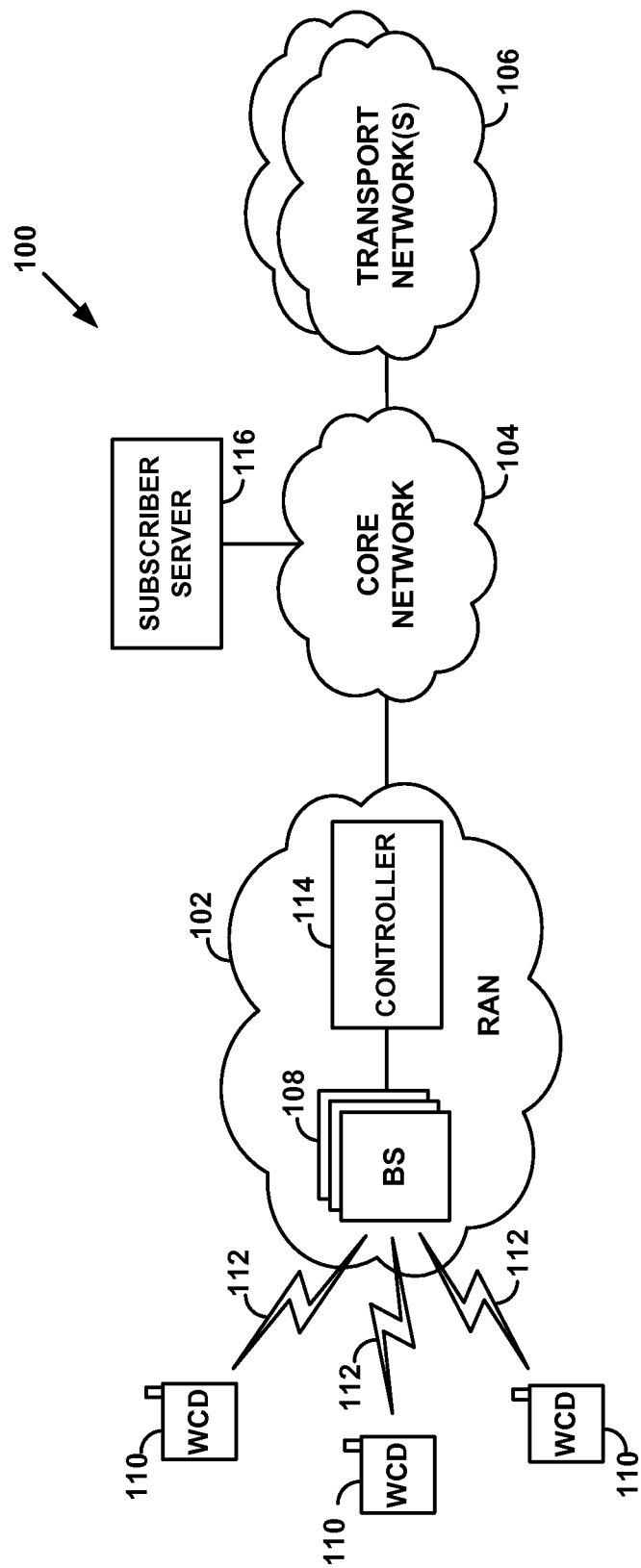
FIG. 1 depicts a simplified block diagram of an example communication system, in which the present methods can be implemented.

FIG. 1 depicts an example communication system 100 as including a RAN 102 and a core network 104, both of which may be operated by a wireless carrier. The RAN may provide connectivity with the core network 104 (e.g., via a controller), and the core network 104 may provide connectivity with one or more transport networks 106, such as the public switched telephone network (PSTN) and the Internet. The RAN 102 may include one or more base stations 108 (e.g., base transceiver stations (BTS), access nodes, node-Bs, eNodeBs (eNB), or the like), each having one or more antennas and associated equipment to facilitate communication with one or more WCDs 110 over a respective air interface 112. Further, to facilitate communication between a RAN 102 (e.g., via base stations and/or other RAN entities) and a subscribed WCD 110, wireless carriers may provide service under an air interface protocol, such as CDMA (e.g., IS-95, IS-2000, 1xRTT, 1xEV-DO, etc.), LTE, WiMax (e.g., IEEE 802.16), iDEN, TDMA, AMPS, GSM, GPRS, UMTS, EDGE, microwave, satellite, MMDS, Wi-Fi (e.g., IEEE 802.11), and Bluetooth. Each protocol may define its own procedures and parameters related to air interface communication. In some networks, wireless carriers may provide service under more than one protocol.

The RAN 102 may include a controller 114, such as a base station controller (BSC), mobile switching center (MSC), serving gateway (S-GW), radio network controller, mobility management entity (MME), or the like, which, depending on implementation, may control aspects of base station 108 and air interface operation and/or may provide connectivity with the core network 104.

The core network 104 may be connected to a subscriber server 116, such as a home location register (HLR) or a home subscriber server (HSS), which may store subscription-related information related to each WCD 110 being served by the RAN 102. For example, the subscriber server 116 may maintain a home profile record of each WCD 110 that subscribes to service with the wireless carrier in a particular region that may include specific subscriber information as well as an indication of where in the RAN 102 the WCD 110 is currently operating (e.g., which base station, switch, or other node that is currently serving the WCD) to facilitate setup of communications to the WCD 110. In practice, when a WCD 110 powers on or moves into a new coverage area, the WCD 110 may scan for and detect a pilot signal broadcast by a base station 108 of the RAN 102 and may then transmit a registration message in an access probe to that base station 108, which may trigger signaling to the subscriber server 116 to update the current location of the WCD 110.

III. Example RAN and Wireless Coverage Areas

Figure 2:
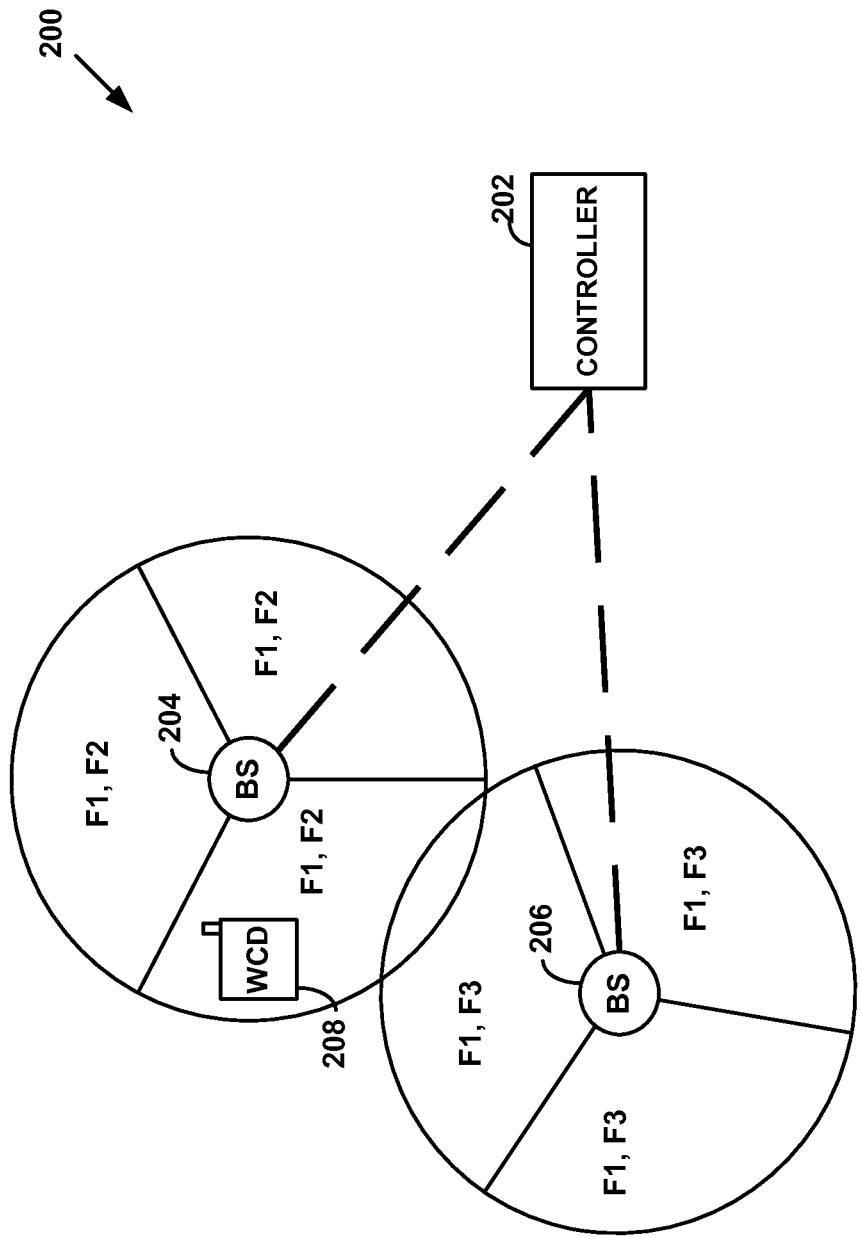
FIG. 2 depicts a block diagram of an example RAN, in which the present methods can be implemented.

FIG. 2 depicts an example RAN 200 including a controller 202 coupled with base stations 204 and 206. As described above with respect to FIG. 1, the controller 202 may be a BSC, MSC, S-GW, radio network controller, MME, or the like. Each base station is shown at the center of a respective circle representing a geographic area of wireless coverage, and each circle is divided into three sectors representing wireless coverage areas. It should be understood that the depiction of three coverage areas for each of the base stations in FIG. 2 is intended to be for purposes of example, and other numbers of coverage areas per base station are possible. Further, the relative positions of the base stations and the relative angular orientations of the coverage areas are also illustrative, and other arrangements may be used. Moreover, in other examples, the coverage areas may take on other shapes and arrangements.

With the arrangement shown in FIG. 2, multiple WCDs, including example WCD 208, may operate in any of the coverage areas and can communicate with one or more base stations in accordance with an air interface protocol (e.g, CDMA, LTE, WiMax, etc.). The air interface in each coverage area may define a forward-link (or "downlink") for carrying communications from the RAN 200 to the WCDs served by a particular coverage area, and a reverse-link (or "uplink") for carrying communications from the WCDs to the RAN 200. In some examples, these links may be defined on one or more carrier frequencies or blocks of frequencies (e.g., frequency bands, such as 698-960 MHz, 1610-2025 MHz, etc.). Further, on each link, various channels may be defined through use of use of time division multiplexing, frequency division multiplexing, and the like, such that multiple WCDs can simultaneously communicate with the serving base station.

By way of example, the forward-link may define a pilot channel for carrying a pilot signal usable by WCDs to detect and evaluate coverage, a paging channel for carrying page messages to particular WCDs, other overhead channels for carrying system parameter information and the like, and a number of traffic channels for carrying bearer traffic (e.g., call traffic) to WCDs. The reverse-link, for example, may define an access channel for carrying messages from WCDs to facilitate registration, responding to pages, originating calls and the like, and may also define a number of traffic channels for carrying bearer traffic from WCDs to the RAN. Depending on the air interface protocol, the channel definitions may differ and other names for the channels may be used.

Under some air interface protocols, certain coverage areas may operate in a time division duplex (TDD) manner. In such coverage areas, forward-link and reverse-link communications may use the same carrier frequency, and the pilot signal may be provided during intermittent forward-link communications to the WCDs in each TDD coverage area and its respective adjacent coverage areas. Under other air interface protocols, however, certain coverage areas may operate in a frequency division duplex (FDD) manner. In such coverage areas, forward-link and reverse-link communications may use separate carrier frequencies, and the pilot signal may be provided during continuous forward-link communications to the WCDs in each FDD coverage area and its respective adjacent coverage areas.

In practice, each coverage area may operate on one or more carrier frequencies. Further, a particular coverage area may operate on one or more of the same carrier frequencies as another coverage area that may be adjacent or non-adjacent to the particular coverage area. As shown, for instance, the coverage areas defined by base station 204 may operate on carrier frequencies F1 and F2, and the coverage areas defined by base station 206 may operate on carrier frequency F1 as well. Still further, a particular coverage area may also operate on one or more carrier frequencies that are different from the carrier frequencies of an adjacent (or non-adjacent) coverage area. As shown, for instance, the coverage areas defined by base station 204 may operate on carrier frequency F2, whereas the coverage areas defined by base station 206 may instead operate on carrier frequency F3 (in addition to base frequency F1).

As noted above, a WCD registered in a particular coverage area may scan for other coverage areas operating on the same carrier frequency. To facilitate the scanning, the WCD's serving base station may broadcast a message to the WCD listing one or more carrier frequencies in use by other coverage areas in the area. Further, the WCD may scan for and detect coverage in other coverage areas on the carrier frequency by measuring signal strength and/or signal quality (e.g., noise ratio or error rate). In turn, the WCD may transmit to its serving base station or RAN a report indicating the detected coverage on the same carrier frequency. Based on such a report, the RAN may determine that an adjacent coverage area provides sufficiently stronger coverage than the serving coverage area of the WCD, and the RAN may then arrange for a handoff of the WCD to the adjacent coverage area, which may be facilitated by the WCD's serving base station or a controller. In doing so, substantially continuous wireless coverage is provided to the WCD as the WCD is handed off by the RAN from one coverage area to another, so that any connection that the WCD has or session the WCD is engaged in is not dropped or degraded due to loss of coverage.

IV. Inter-Frequency Handoff

When a WCD is operating in a particular coverage area and seeks to evaluate the strength of coverage available in one or more other coverage areas, the WCD may need to temporarily pause its operation in its serving coverage area while it tunes away to scan for the other coverage. This pause in operation may be necessary, for instance, if the serving coverage area operates on a different carrier frequency than the one or more other coverage areas, as the WCD may need to tune away from its serving carrier frequency to scan for coverage on one or more other carrier frequencies. Further, the pause in operation may be necessary if the serving coverage area operates on a different air interface protocol than the one or more other coverage areas, as the WCD may need to switch between radio interfaces in order to scan for coverage on one or more other air interface protocols. Each air interface protocol may define its own procedures for handoff between coverage areas, and such handoffs may also occur between coverage areas under a common air interface protocol.

In order to search for and evaluate better coverage on the other carrier frequencies, the RAN may send an inter-frequency search directive to the WCD, such as a carrier frequency search request message (CFSRQM), to cause the WCD to scan for coverage under the other carrier frequencies. In response to receiving the message, the WCD may tune to and scan for coverage on the carrier frequencies designated in the message so as to facilitate an inter-frequency handoff to stronger coverage once the WCD's serving coverage becomes threshold weak.

In an example inter-frequency handoff scenario, a WCD may monitor the pilot signal (or reference signals) of both its serving coverage area as well as other coverage areas, all on a given carrier frequency (e.g., the current carrier frequency of the WCD). By doing so, the WCD may detect threshold weak signal strength on the given carrier frequency and report such poor coverage to the RAN (e.g., via the serving base station of the WCD). The report may take the form of a pilot-strength-measurement message, data-rate-control message, and the like. In response to receiving the report, the RAN may send a CFSRQM or other such search directive to the WCD including one or more particular carrier frequencies other than the given carrier frequency. The WCD may then begin to monitor the signal strength of any or all of the particular carrier frequencies in search of better coverage. Further, the WCD may report any sufficiently stronger coverage to the RAN so that the RAN may arrange for an inter-frequency handoff to one of the particular carrier frequencies.

In another example scenario, the RAN may determine that a WCD is in a coverage area that is not adjacent to any coverage areas operating on the same carrier frequency as the WCD's serving carrier frequency. The RAN may also determine that the WCD is threshold distant from the serving base station of the WCD by evaluating round trip signal delay to and from the WCD, or by other methods. In response to determining both of the above, the RAN may then send an inter-frequency search directive to the WCD to direct the WCD to tune to and search for coverage on other carrier frequencies. Once sufficiently stronger coverage is found and reported back to the RAN, the WCD may send another message to the RAN so as to enable the inter-frequency handoff to occur.

As noted above, continuous inter-frequency scanning in all or numerous coverage areas of a RAN may negatively affect network performance and/or WCD performance. For example, continuous scanning may cause many channel resources to be allocated in order to allow for numerous messages/directives to be transmitted between the RAN and a WCD as a result of the scanning. As another example, while regularly scanning for coverage, a WCD may configured to continuously power-up and power-down its radio module, which may consume excessive battery power. Similarly, the radio module may remain powered-up in order to continually scan for and/or connect to coverage, as opposed to periodically powering-up and down the radio module, which may also consume battery power. As yet another example, a WCD continuously tuning away and re-tuning to scan for coverage on other carrier frequencies may consume battery power as well.

V. Example Operations

Figure 3:
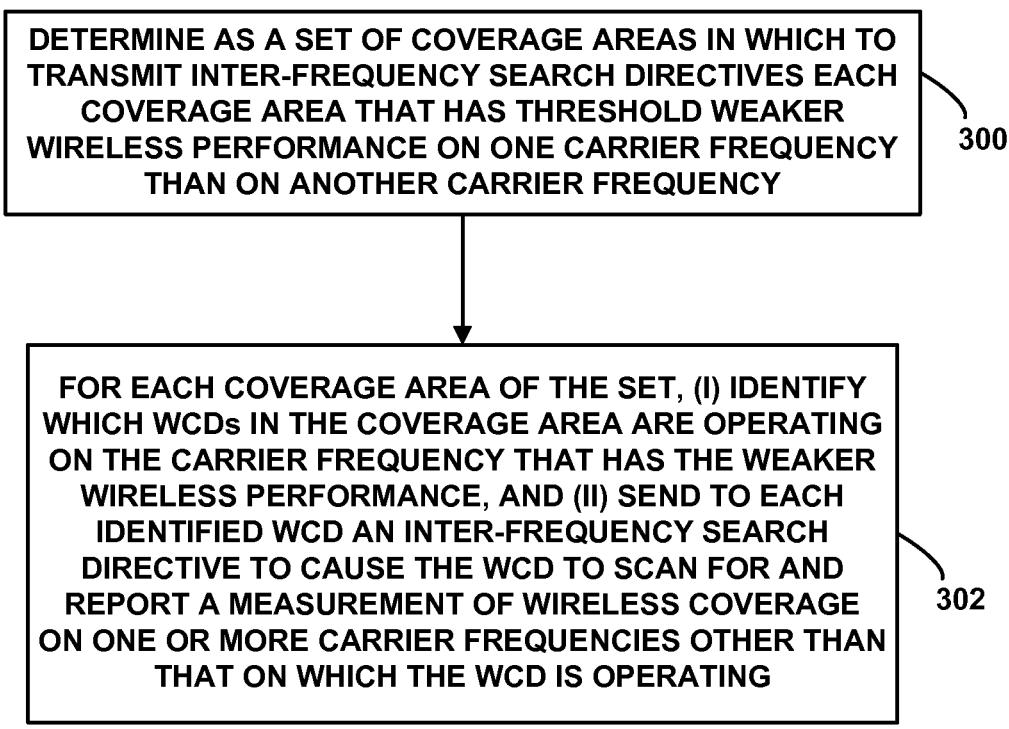
FIG. 3 is a flow chart depicting functions that can be carried out in accordance with the present methods.
Figure 4:
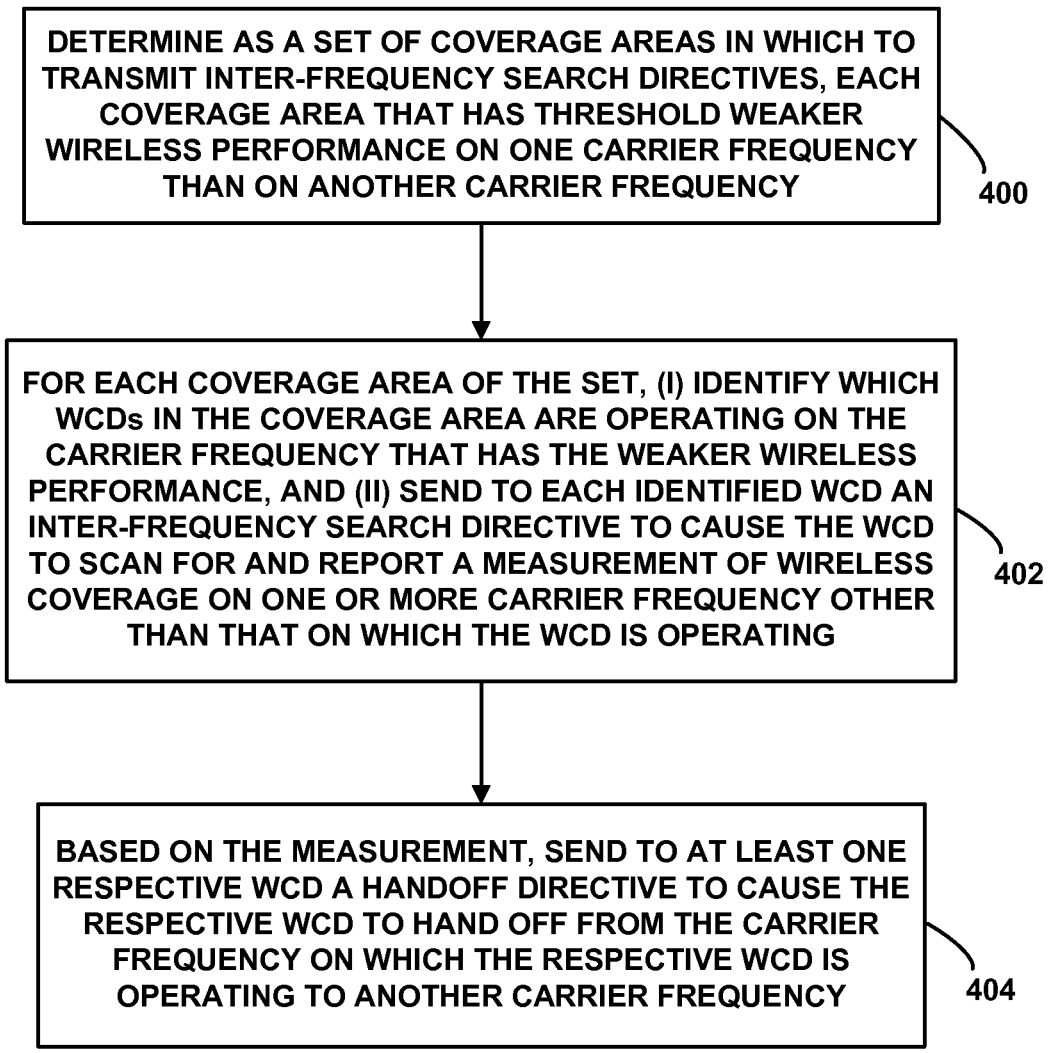
FIG. 4 is a flow chart depicting functions that can be carried out in accordance with the present methods.

FIG. 3 and FIG. 4 are flow charts depicting functions that can be carried out in accordance with the present methods. For the sake of example, the present methods will be assumed to be carried out with respect to the network arrangements illustrated in FIG. 1 and FIG. 2. It should be understood, however, that in other examples, the present methods may also be carried out with respect to other network arrangements. In such other examples, the present methods may be carried out by one or more of the RAN entities described above, or by other RAN entities not described above. Further, the present methods may be carried out by a RAN entity in accordance with one or more WCDs (or other such devices) different than those described herein.

The present methods may include one or more operations, functions, or actions as illustrated by one or more of blocks 300-302 and 400-404. Although the blocks are illustrated in a sequential order, the functions illustrated by the blocks may also be performed in parallel, and/or in another order different than those described herein.

Referring to FIG. 3, at block 300, the method involves the RAN (e.g., a RAN entity such as a BTS, BSC, MSC, eNB, ePDG, SGW, MME, etc.) determining a set of coverage areas in which to transmit inter-frequency search directives. In order to determine such a set of coverage areas, the RAN may identify each coverage area that has threshold weaker wireless performance (e.g., coverage) on one carrier frequency than on another carrier frequency. For example, the RAN may identify each coverage area based on measurement reports received by the RAN from WCDs operating in each coverage area defined by the RAN. A measurement report for a given coverage area may indicate the quality of wireless performance on one or more carrier frequencies of the given coverage area, and such a report may take the form of a pilot-strength-measurement message, a data-rate-control message, a radio measurement report, and the like.

Further, in order to determine which coverage areas have threshold weaker performance on one carrier frequency than on another, the RAN may evaluate forward-link and/or reverse-link communications between the RAN and the WCDs operating in the coverage areas defined by the RAN. By way of example, the pilot signal of a given coverage area defined by the RAN may be provided by a serving base station of the given coverage area during continuous forward-link communications, and a WCD may monitor the pilot signal so as to evaluate coverage on a particular carrier frequency of the given coverage area. As a result of the WCD's evaluation of coverage on the particular carrier frequency, the RAN may receive a report from the WCD (e.g., during reverse-link communications with the RAN) indicating the strength of the monitored pilot signal, and the RAN may determine that the given coverage area has threshold weaker signal strength on the particular carrier frequency.

In some scenarios, such as in a CDMA network, a WCD may have an "active set" of coverage areas with which the WCD is actively communicating with. In this arrangement, the WCD may regularly monitor the strength of pilot signals that it receives (e.g., during forward-link communications) from each member of its active set of coverage areas, as well as pilot signals broadcasted in other coverage areas. Further, as the monitored signal strengths fluctuate, the RAN may add members to or remove members from the WCD's active set. If the WCD thereby detects a pilot signal from a given coverage area in its active set that has threshold weaker signal strength than another pilot signal from the given coverage area, the WCD may send a report to the RAN indicating the threshold weaker signal strength, and the RAN may responsively add the given coverage area to the set of coverage areas in which to transmit the inter-frequency search directives.

A RAN may have other means of detecting threshold weaker coverage on one carrier frequency than on another carrier frequency in a given coverage area. For example, a base station of the given coverage area may have a limited amount of transmission power (e.g., a maximum power level of the base station's power amplifier), and the base station may need to allocate that power among communications with the WCDs operating in the given coverage area. As such, if a WCD operating in the given coverage area has high transmission power over forward-link communications with the RAN on a particular carrier frequency, such high transmission power may indicate to the RAN that the particular carrier frequency may have threshold weaker signal strength than another carrier frequency with less transmission power allocated to it.

As another example, a WCD may evaluate signal strength over forward-link communications with the RAN and the WCD may send a radio module power-up command to its serving base station each time the WCD detects weak signal quality. Further, the RAN may determine that a particular carrier frequency of a coverage area has threshold weaker signal strength than another carrier frequency of the coverage area based on the RAN receiving more power-up commands from one or more WCDs operating on the particular carrier frequency than from one or more WCDs operating on another carrier frequency. Other examples of detecting threshold weaker coverage are also possible.

At block 302, the method involves the RAN identifying, for each coverage area of the identified set, which WCDs in the coverage area are operating on the carrier frequency that has the weaker wireless performance. As an example, in some scenarios, a RAN may limit the identifying to only those WCDs that are experiencing coverage that is weaker than a predefined coverage performance threshold. Further, the predefined coverage performance threshold may vary depending on the network arrangement and/or network conditions (e.g., network protocol, the number of WCDs served by the network, base station transmission power capacities, etc.).

Referring back to block 302, the method further involves the RAN sending to each identified WCD an inter-frequency search directive to cause the WCD to scan for and report a measurement of wireless coverage on one or more carrier frequencies other than the carrier frequency on which the WCD is operating. In some scenarios, the RAN may send such inter-frequency search directives to only the identified WCDs and not to other WCDs operating in the coverage areas defined by the RAN.

By way of example, the inter-frequency search directive sent to each identified WCD may take the form of a CFSRQM that specifies one or more carrier frequencies on which the WCD should scan for handoff coverage. Further, the specified carrier frequencies may include one or more carrier frequencies in one or more coverage areas in which the WCD is currently operating. Additionally or alternatively, the specified carrier frequencies may include one or more carrier frequencies in coverage areas other than the one or more coverage areas in which the WCD is currently operating (e.g., in at least one coverage area that is not a member of the WCD's active set of coverage areas).

In response to receiving the CFSRQM, the WCD may tune to the one or more specified carrier frequencies and scan for pilot signals indicative of sufficiently stronger coverage. In turn, the WCD may then send a CFSRQM response message to the RAN, providing the RAN with a report including a measurement of the stronger coverage on the one or more specified carrier frequencies. In some scenarios, the WCD may provide a report including (e.g., solely including) measurements of coverage on the one or more specified carrier frequencies that is threshold stronger than the coverage on the WCD's current carrier frequency. In response to receiving the report, the RAN may then send to each identified WCD a handoff directive (e.g., a handoff direction message) that directs the WCD to hand off from the carrier frequency on which the WCD is currently operating to one of the specified carrier frequencies with stronger (or otherwise more preferable) coverage.

As noted above, in some scenarios, it may be disadvantageous for the RAN to continuously direct a WCD to scan for coverage. As such, the present methods may further involve the RAN determining that the WCD should discontinue inter-frequency scanning. In practice, the RAN may send a stop-scanning directive to the WCD in response to determining that the WCD should discontinue scanning. To facilitate this, the RAN may make such a determination responsive to the WCD moving from a given coverage area of the identified set of coverage areas to a coverage area that is not included in the identified set.

In an example scenario, an identified WCD may have an active set of coverage areas, and at least one coverage area of the identified set may be included in the WCD's active set at a given point in time. Further, the RAN may direct the WCD to regularly scan for sufficiently stronger coverage one or more carrier frequencies other than the carrier frequency on which the WCD is currently operating. At a later point in time, however, and perhaps as a result of the WCD moving from one coverage area to another, the RAN may determine that no coverage area of the identified set is included in the WCD's active set. As such, the RAN may send a stop-scanning directive to the WCD.

In another example scenario, the RAN may update the identified set of coverage areas. To update the identified set, the RAN may newly identify which of its coverage areas each have threshold weaker coverage on one carrier frequency of the coverage area than on another carrier frequency of the same coverage area. The RAN may then determine a new (e.g., updated) set of coverage areas comprising the newly identified coverage areas. By determining the updated set, the RAN may add or remove coverage areas from the previously identified set. In line with the previous example, after determining the updated set, the RAN may determine that no wireless coverage area of the updated set is included in the WCD's active set. The RAN may then send the stop-scanning directive to the WCD.

Referring now to FIG. 4, at block 400, and as stated above with respect to block 300 of FIG. 3, the method involves the RAN determining a set of coverage areas in which to transmit inter-frequency search directives by identifying each coverage area that has threshold weaker wireless performance on one carrier frequency than on another carrier frequency. Further, at block 402, and as stated above with respect to block 302 of FIG. 3, the method involves the RAN identifying, for each coverage area of the identified set, which WCDs in the coverage area are operating on the carrier frequency that has the weaker wireless performance, and the RAN sending to each identified WCD an inter-frequency search directive to cause the WCD to scan for and report a measurement of wireless coverage on one or more carrier frequencies other than the carrier frequency on which the WCD is operating. Still further, at block 404, the method involves, based on the measurement of wireless coverage, the RAN sending to at least one respective WCD a handoff directive to cause the respective WCD to hand off from the carrier frequency on which the respective WCD is operating to another carrier frequency (e.g., the inter-frequency handoff).

VI. Example Network Devices a. Example RAN entity

Figure 5:
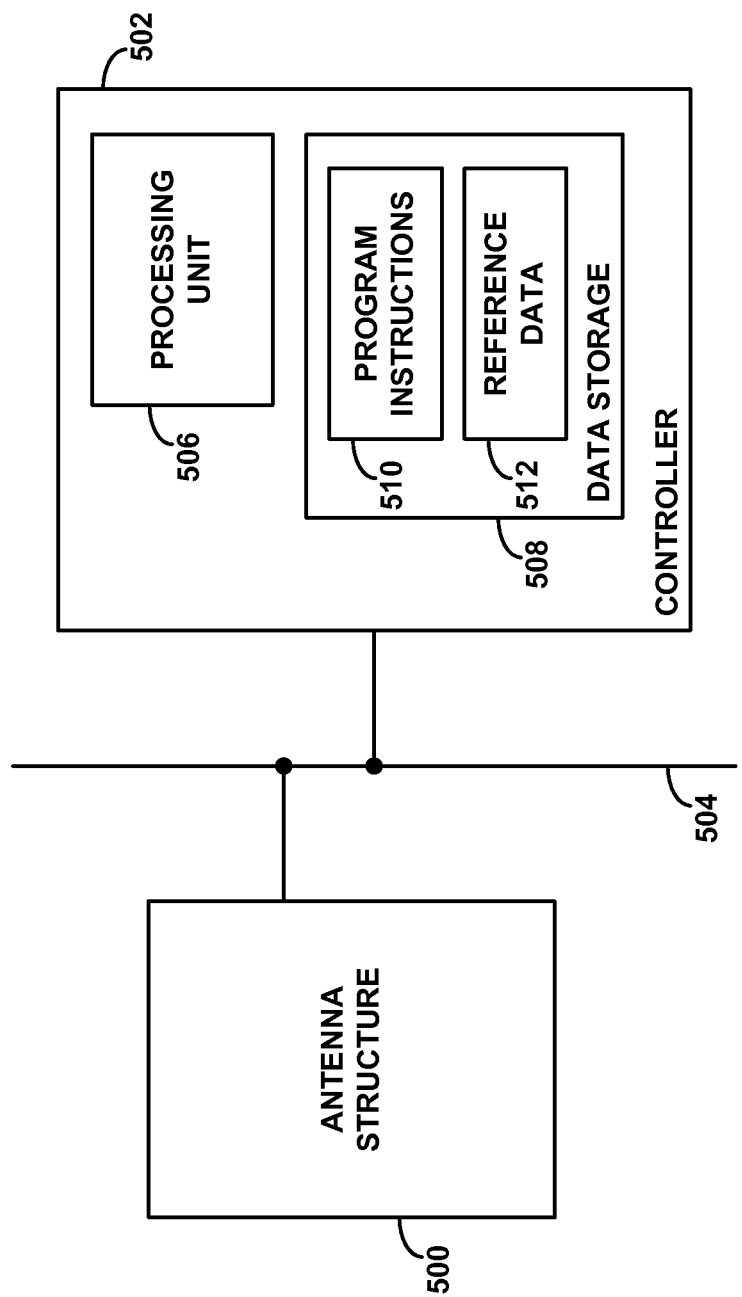
FIG. 5 depicts a simplified block diagram depicting components of an example wireless communication system arranged to implement aspects of the present methods.

FIG. 5 depicts a simplified block diagram depicting components of an example wireless communication system arranged to implement aspects of the present methods. As shown, the example system includes an antenna structure 500 and a controller 502, which may be coupled together by a system bus, network, or other connection mechanism 504. In an example implementation, the components of this system may be provided in one or more RAN entities, such as a BTS, eNB, BSC, MSC, SGW, and MME, or the components may be distributed among various such RAN entities. Additionally or alternatively, the components may be provided in other entities in the wireless communication system.

The antenna structure 500 may comprise one or more antennas configured to radiate so as to define an air interface coverage area in which to serve one or more WCDs. In some implementations, the antenna structure 500 may be arranged to communicate over a given air interface with a base station, controller, and/or or other entities noted above. The controller 502 may comprise a processing unit 506 (e.g., one or more general purpose processors and/or one or more special purpose processors) and non-transitory data storage 508 (e.g., volatile and/or non-volatile storage such as magnetic, optical, or flash storage, possibly integrated in whole or in part with the processing unit 506). As shown, the non-transitory data storage 508 may hold program instructions 510, which may be executable by the processing unit 506 to carry out various functions described herein. For instance, the functions may include generating and transmitting via the antenna arrangement an inter-frequency search direction message (e.g., a CFSRQM).

Further, the non-transitory data storage 508 may hold reference data 512 for use in accordance with the present methods, such as wireless performance measurements, a set of coverage areas with threshold weaker coverage on a given carrier frequency, and a list WCDs identified to be operating in the set of coverage areas. In some examples, the processing unit 506 and the non-transitory data storage 508 could be provided as any combination of hardware, firmware, and/or software.

b. Example WCD

FIG. 6 depicts a simplified block diagram of an example WCD arranged to operate in an example RAN in accordance with the present methods. As shown in FIG. 6, the example WCD includes a wireless communication interface 602, a processor 604, and non-transitory data storage 606, all of which may be communicatively linked together by a system bus, network, or other connection mechanism 608. Variations from this arrangement are of course possible as well, including addition and omission of components, combination of components, and distribution of components in any of a variety of ways.

In the arrangement shown, wireless communication interface 602 may function to engage in air interface communication with base stations such as those shown in FIGS. 1 and 2. As such, the wireless communication interface may include an antenna structure and a chipset arranged to support wireless communication according to one or more air interface protocols, such as those discussed above, for instance.

The processor 604 may comprise one or more general purpose processors (e.g., microprocessors) and/or more special purpose processors (e.g., application specific integrated circuits or the like) and may be integrated in whole or in part with wireless communication interface 602. The non-transitory data storage 606 may then comprise one or more volatile and/or non-volatile storage components, particularly non-transitory storage, such as magnetic, optical, or flash memory for instance, and may be integrated in whole or in part with the processor 604. Additionally or alternatively, the non-transitory data storage 606 may be provided separately, as a non-transitory machine readable medium.

As shown, the non-transitory data storage 606 may hold (e.g., contain, store, or be encoded with) program instructions 610 (e.g., machine language instructions or other program logic, markup or the like) executable by the processor to carry out various functions described herein. The non-transitory data storage 606 may also hold reference data 612 for use in accordance with the present methods, such as records/reports of detected wireless coverage, the WCD's active set of coverage areas, and sets of coverage areas identified by the RAN as listed by the inter-frequency search directive(s).

While various aspects have been disclosed herein, other aspects will be apparent to those skilled in the art. The various aspects disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. In a radio access network (RAN) that radiates to define a plurality of wireless coverage areas each operating on a plurality of carrier frequencies, a method comprising:

the RAN identifying a set of the wireless coverage areas in which to transmit inter-frequency search directives, wherein identifying the set of wireless coverage areas comprises (i) determining which of the wireless coverage areas each have threshold weaker wireless performance on one carrier frequency of the coverage area than on another carrier frequency of the coverage area and (ii) deeming to be members of the set only the determined wireless coverage areas; and for each wireless coverage area of the identified set, the RAN (i) identifying one or more wireless communication devices (WCDs) operating in the coverage area that are operating on the coverage area's carrier frequency that has the weaker wireless performance and (ii) based at least in part on the identifying of each of the one or more WCDs, sending to each identified WCD an inter-frequency search directive to cause the WCD to scan for and report to the RAN a measurement of wireless coverage on one or more carrier frequencies other than that on which the WCD is operating.

2. The method of claim 1, further comprising:

the RAN receiving, from each respective WCD of the one or more identified WCDs, a report indicative of the measurement of wireless coverage on the one or more carrier frequencies other than that on which the respective WCD is operating.

3. The method of claim 2, further comprising:

responsive to the received report from each respective WCD, the RAN sending to at least one respective WCD a handoff directive to cause the at least one respective WCD to hand off from the carrier frequency on which the at least one respective WCD is operating to another carrier frequency.

4. The method of claim 1, wherein each respective WCD has an active set of coverage areas, the method further comprising:

the RAN sending a stop-scanning directive to a given identified WCD of the one or more WCDs in response to determining that no wireless coverage area of the identified set is in the active set of the given identified WCD.

5. The method of claim 1, wherein each respective WCD has an active set of coverage areas, the method further comprising:

the RAN updating the identified set of wireless coverage areas, wherein the updating comprises (i) newly determining which of the wireless coverage areas each have threshold weaker wireless performance on one carrier frequency of the coverage area than on another carrier frequency of the coverage area and (ii) deeming to be members of the set only the newly determined wireless coverage areas; and the RAN sending a stop-scanning directive to a given identified WCD of the one or more WCDs in response to determining that no wireless coverage area of the updated identified set is in the active set of the given identified WCD.

6. The method of claim 1, wherein the inter-frequency search directive is a carrier frequency search request message (CFSRQM), and wherein reporting the measurement to the RAN comprises the WCD sending to the RAN a CFSRQM response message indicating the measurement of wireless coverage.

7. The method of claim 1, carried out by one or more RAN entities operating in accordance a Long-Term Evolution (LTE) air interface protocol, wherein each of the one or more RAN entities is selected from the group consisting of a mobility management entity (MME), a serving gateway (SGW), an Evolved Packet Data Gateway (ePDG), and an eNodeB (eNB).

8. The method of claim 1, carried out by one or more RAN entities operating in accordance with a Code-Division Multiple Access (CDMA) air interface protocol, wherein each of the one or more RAN entities is selected from the group consisting of a mobile switching center (MSC), a base station controller (BSC), and a base transceiver station (BTS).

9. A non-transitory computer-readable medium having stored thereon program instructions executable by a processing unit of a radio access network (RAN) to cause the RAN to perform functions, the RAN radiating to define a plurality of wireless coverage areas each operating on a plurality of carrier frequencies, the functions comprising:
  identifying a set of the wireless coverage areas in which to transmit inter-frequency search directives, wherein identifying the set of wireless coverage areas comprises (i) determining which of the wireless coverage areas each have threshold weaker wireless performance on one carrier frequency of the coverage area than on another carrier frequency of the coverage area and (ii) deeming to be members of the set only the determined wireless coverage areas; and
  for each wireless coverage area of the identified set, (i) identifying one or more wireless communication devices (WCDs) operating in the coverage area that are operating on the coverage area's carrier frequency that has the weaker wireless performance and (ii) based at least in part on the identifying of each of the one or more WCDs, sending to each identified WCD an inter-frequency search directive to cause the WCD to scan for and report to the RAN a measurement of wireless coverage on one or more carrier frequencies other than that on which the WCD is operating.

10. The non-transitory computer-readable medium of claim 9, wherein the functions further comprise:
  receiving, from a given WCD of the one or more identified WCDs, a report indicative of the measurement of wireless coverage on the one or more carrier frequencies other than that on which the given WCD is operating; and
  responsive to the received report, directing the given WCD to hand off from the carrier frequency on which the given WCD is operating to another carrier frequency.

11. The non-transitory computer-readable medium of claim 9, wherein identifying the one or more WCDs operating in the coverage area that are operating on the coverage area's carrier frequency that has the weaker wireless performance comprises limiting the identification to WCDs that are experiencing wireless coverage performance weaker than a predefined wireless coverage performance threshold.

12. The non-transitory computer-readable medium of claim 9, wherein causing the WCD to scan for and report to the RAN the measurement of wireless coverage on one or more carrier frequencies other than that on which the WCD is operating comprises causing the WCD to scan one or more carrier frequencies in one or more coverage areas in which the WCD is currently operating.

13. The non-transitory computer-readable medium of claim 9, wherein each respective WCD has an active set of coverage areas, wherein causing the WCD to scan for and report to the RAN the measurement of wireless coverage on one or more carrier frequencies other than that on which the WCD is operating comprises causing the WCD to scan one or more carrier frequencies in at least one coverage area that is not a member of the active set of the WCD.

14. The non-transitory computer-readable medium of claim 9, wherein the measurement of wireless coverage on one or more carrier frequencies other than that on which the WCD is operating is a measurement of wireless coverage on one or more carrier frequencies other than that on which the WCD is operating that have threshold stronger wireless performance than that on which the WCD is operating.

15. A radio access network (RAN) entity comprising:
  at least one wireless communication interface;
  at least one processor;
  a data storage; and
  program instructions stored in the data storage, wherein the program instructions are executable by the at least one processor to perform a set of functions, the set of functions comprising:
    identifying a set of wireless coverage areas in which to transmit inter-frequency search directives, wherein identifying the set of wireless coverage areas comprises (i) determining which of the wireless coverage areas each have threshold weaker wireless performance on one carrier frequency of the coverage area than on another carrier frequency of the coverage area and (ii) deeming to be members of the set only the determined wireless coverage areas;
    for each wireless coverage area of the identified set, (i) identifying one or more wireless communication devices (WCDs) operating in the coverage area that are operating on the coverage area's carrier frequency that has the weaker wireless performance, and (ii) based at least in part on the identifying of each of the one or more WCDs, sending to each identified WCD an inter-frequency search directive to cause the WCD to scan for and report to the RAN entity a measurement of wireless coverage on one or more carrier frequencies other than that on which the WCD is operating; and
    based on the measurement reported to the RAN entity by each identified WCD, sending to the WCD a handoff directive to cause the WCD to hand off from the carrier frequency on which the WCD is operating to another carrier frequency.

16. The RAN entity of claim 15, wherein determining which of the wireless coverage areas each have threshold weaker wireless performance on one carrier frequency of the coverage area than on another carrier frequency of the coverage area is based at least in part on the RAN entity evaluating one or more of forward-link communications and reverse-link communications between the RAN entity and the one or more WCDs operating in the wireless coverage areas.

17. The RAN entity of claim 15, wherein each respective WCD has an active set of coverage areas, wherein determining which of the wireless coverage areas each have threshold weaker wireless performance on one carrier frequency of the coverage area than on another carrier frequency of the coverage area is based at least in part on the RAN entity receiving a report from the one or more WCDs operating in the wireless coverage areas indicative of the one or more WCDs detecting threshold low signal strength on at least one of the coverage areas that are in the active set of the one or more WCDs.

18. The RAN entity of claim 15, wherein the inter-frequency search directive is a carrier frequency search request message (CFSRQM), and wherein reporting the measurement to the RAN entity comprises the WCD sending to the RAN entity a CFSRQM response message indicating the measurement of wireless coverage.

19. The RAN entity of claim 15, wherein each respective WCD has an active set of coverage areas, the method further comprising:
   sending a stop-scanning directive to a given identified WCD of the one or more WCDs in response to determining that no wireless coverage area of the identified set is in the active set of the given identified WCD.

20. The RAN entity of claim 15, wherein each respective WCD has an active set of the identified set of coverage areas, the method further comprising:
   updating the identified set of wireless coverage areas, wherein the updating comprises (i) newly determining which of the wireless coverage areas each have threshold weaker wireless performance on one carrier frequency of the coverage area than on another carrier frequency of the coverage area and (ii) deeming again to be members of the set only the newly determined wireless coverage areas; and
   sending a stop-scanning directive to a given identified WCD of the one or more WCDs in response to determining that no wireless coverage area of the updated identified set is in the active set of the given identified WCD.

* * * * *